W. D. WILSON.
AUTOMATIC WEIGHING APPARATUS.
APPLICATION FILED DEC. 1, 1913.
1,093,673.
Patented Apr. 21, 1914.
2 SHEETS—SHEET 2.
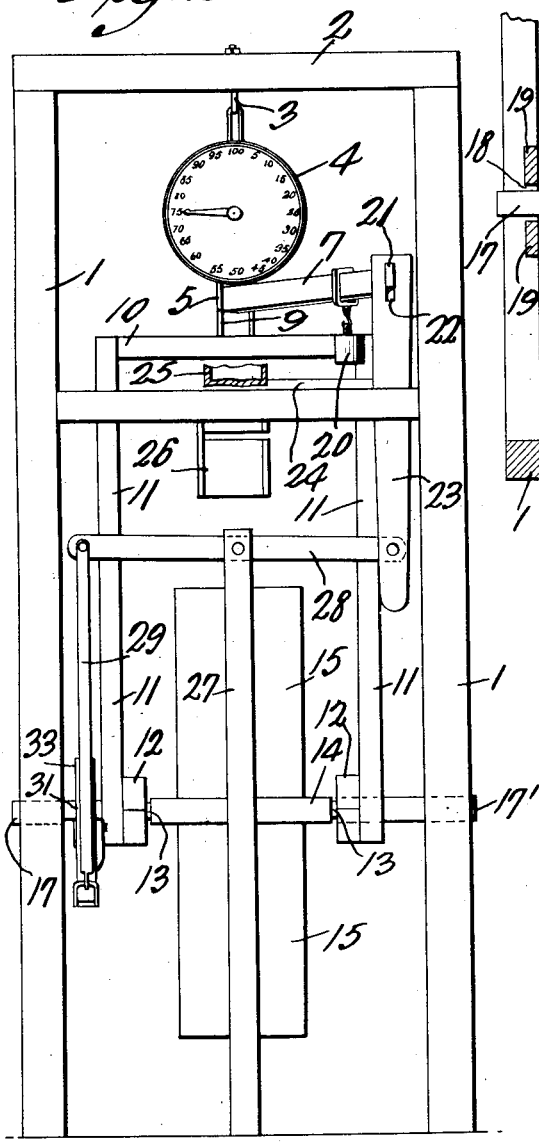
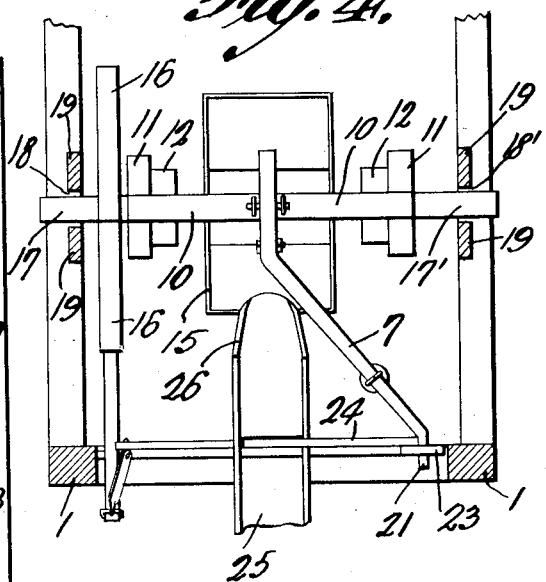
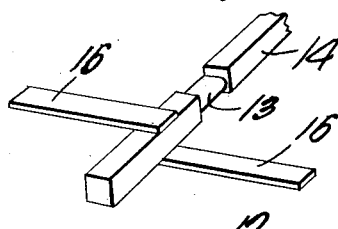
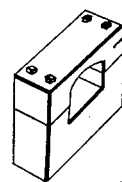
Witnesses
Wesley D. Wilson Inventor
by C. A. Snow & Co.
Attorneys

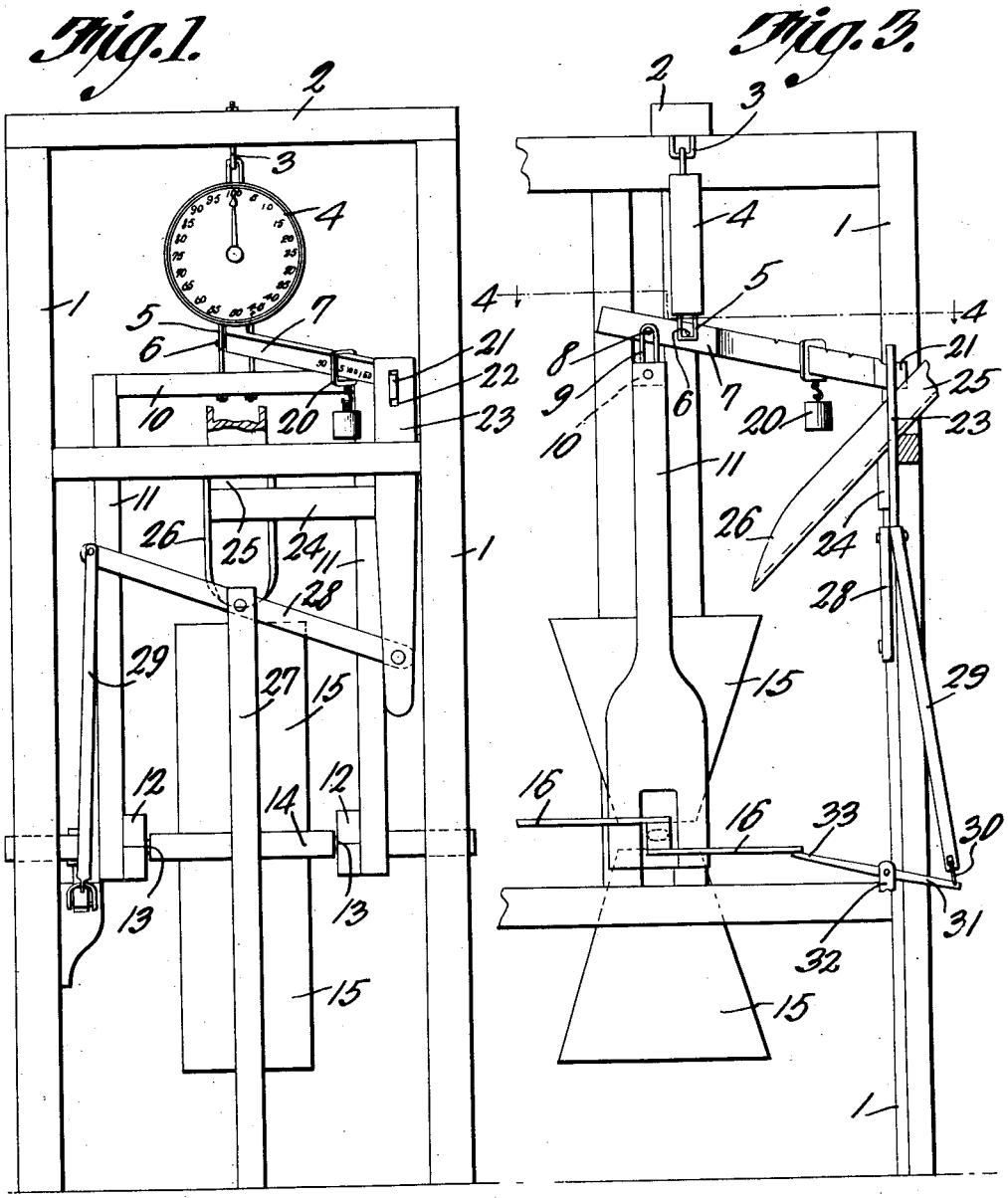

UNITED STATES PATENT OFFICE.

WESLEY D. WILSON, OF CORDELE, GEORGIA.

AUTOMATIC WEIGHING APPARATUS.

1,093,673.  Specification of Letters Patent.  Patented Apr. 21, 1914.

Application filed December 1, 1913. Serial No. 804,028.

*To all whom it may concern:*

Be it known that I, WESLEY D. WILSON, a citizen of the United States, residing at Cordele, in the county of Crisp and State of Georgia, have invented a new and useful Automatic Weighing Apparatus, of which the following is a specification.

The present invention relates to improvements in automatic weighing apparatus, one object of the present invention being the provision of a weighing apparatus provided with a plurality of material receptacles disposed for rotation, the filled one overbalancing an empty one and during the movement caused by filling and before emptying, actuating means for cutting off the supply of material and maintaining such cut off in such position until the empty material receiver is in position and the scale has returned to normal position.

A further object of the present invention is the provision of an automatic weighing apparatus especially adapted to be used in connection with grain elevators, so that a supply of grain from the elevator or other means may be delivered by gravity into a receptacle which is connected to a scale beam, such scale beam being swingingly connected intermediate of its ends to depend from a spring scale, so that when the receptacle is properly filled, the scale beam will be actuated to automatically close a valve to prevent the further supply of grain to the receptacle, such receptacle being tilted to overbalance by a mechanism operated simultaneously with the closing of the valve to cause the same to be tilted into emptying position, the weight of the filled receptacle placing an empty receptacle in position to receive the flow of grain controlled by the valve, which now automatically opens due to the lowering of the scale beam.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings Figure 1 is an elevation of the complete weighing apparatus taken from the delivery side thereof, the parts being in the position they assume when the valve is open and the scale receptacle is being filled. Fig. 2 is a similar view to Fig. 1 with the parts in the position they assume at the final filling of one of the receptacles and just previous to the dumping thereof, the valve being closed. Fig. 3 is a view taken from the left of Fig. 1 with a portion of the framework removed to show the means for automatically tilting the material receptacle. Fig. 4 is a section taken on line 4—4 of Fig. 3. Fig. 5 is a perspective view of the shaft and trip means of the material receptacle portion of the scales. Fig. 6 is a perspective view of one of the shaft journal boxes.

Referring to the drawings, the numeral 1 designates the vertical standards of the framework which carry at the top the cross piece 2 provided with an eye 3 for the support of the spring scales 4. This scale 4 may be of ordinary form and construction, having the movable connection 5 engaging the opposite pin 6 of the weighing machine beam 7. This beam 7 is provided with an offset end 21, the purpose of which will presently appear. The beam 10 of the movable member of the present weighing apparatus carries the two depending members 11, at the lower end of which are connected the boxes 12 for the round portions 13 of the receptacle carrying rectangular shaft 14. Connected to the rectangular portion of the shaft 14 at diametrically opposite sides, are the frusto-conical receptacles, while connected at the same sides of the shaft upon one end thereof are the oppositely disposed blades 16, as clearly illustrated in Fig. 3.

As clearly illustrated in Figs. 3 and 4, the extreme outer square ends of the shaft 14 are disposed for sliding movement within the slots 18—18′ of the members 19, such slots being so shaped as to assist in holding the shaft against too far rotation when the filled receptacle 15 has overbalanced the empty one therebelow and has tilted to the left as viewed in Fig. 3 for dumping the material therefrom and for uprighting the lower receptacle for receiving the material.

The scale beam 7 is provided with graduations, as clearly shown in Fig. 1, and disposed for adjustment thereupon is the weight 20, the hooked reduced end 21 being disposed through the slot or aperture 22 in the upper end of the vertically movable plate 23. This plate 23 is disposed to place the valve 24 into and out of controlling relation to the grain delivery spout 25, the lower end 26 of which is disposed to direct the grain into the upper uprighted receptacle 15, as clearly illustrated in Figs. 1 and 3. The valve 24 is disposed for movement vertically and transversely through a slot in the chute 25 and thus controls the flow of material. Thus the beam 7, controls the vertical movement of the member 22 and consequently the valve 24 into opening and closing position. The parts when in the position as shown in Fig. 1 maintain the valve open, while when in the position shown in Fig. 2, when the filled receptacle 15, has caused the depression of the movable scale member of the spring scale 4, and the carrying portion of such filled member 15 has placed one of the blades 16 in engagement with the free end 33 of the pivoted lever 31, the valve 24 is moved to the uppermost position as shown in Fig. 2, and consequently the flow of grain through the spout to the receptacle 15 is cut off. As the bar 23 is elevated due to the filling of the upper receptacle 15 and the consequent lowering of the shaft 14, one blade 16, as illustrated in Fig. 3, engages the free end 33 of the lever 31, and as the link 28 which is pivoted in the upper end of the standard 27 had the end connected to the plate 23 elevated, the link 29 caused the lever 31 to have its inner end 33 elevated and consequently give the shaft 14 a slight movement to the left, as shown in Fig. 3, so as to permit of the proper overbalancing thereof by the filled receptacle 15, and which being overbalanced automatically empties and places the lowermost receptacle 15 in position to receive a new charge. When the parts were in this position, the weight 20 upon the beam 7 overbalanced the frames 10 and 11 so as to elevate the receptacle into position to receive a charge from the spout and at the same time the valve 24 is lowered to permit of the grain or cotton seed passing therethrough.

From the foregoing description it will be seen that automatic means is provided for weighing and delivering cotton seed from the gin or grain from an elevator, the same being controlled entirely due to the overbalancing effect of the beam 7 due to the material falling within the uppermost receptacle 15, the elevation of the plate 23 and the consequent tilting through one of the blades 16 of the shaft 14. By means of the boxes 12 and the flattened side of the portions 13 the shaft 14 is prevented from rotating more than 180° at each emptying operation so that one receptacle 15 will always be positioned and held to receive material.

What is claimed is:

1. A weighing apparatus, including a supporting structure, a spring scale connected thereto, a weight controlled scale beam connected to the spring scale, a material receiving member connected to one end of the scale beam, two receptacles rotatably mounted and carried by the material receiving member, a chute leading into one of the receptacles at a time, a valve for controlling the supply of material through the chute, and automatic means connected to the opposite end of the scale beam for actuating the valve to close the same when one of the receptacles is filled and for opening the same when the receptacle is emptied.

2. A weighing apparatus, including a supporting structure, a spring scale connected thereto, a weight controlled scale beam connected to the spring scale, a material receiving member connected to one end of the scale beam, two receptacles rotatably mounted and carried by the material receiving member, a chute leading into one of the receptacles at a time, a valve for controlling the supply of material through the chute, automatic means connected to the opposite end of the scale beam for actuating the valve to close the same when one of the receptacles is filled and for opening the same when the receptacle is emptied, and coöperative means carried by the rotating receptacles and operably connected to the valve actuating means for starting the initial tilting of the receptacle when filled.

In testimony that I claim the foregoing as my own, I have hereto affixed my signature in the presence of two witnesses.

WESLEY D. WILSON.

Witnesses:
J. F. HARTLEY,
T. S. FELDER.

Copies of this patent may be obtained for five cents each, by addressing the "Commissioner of Patents, Washington, D. C."